(12) United States Patent
Soni

(10) Patent No.: US 10,223,340 B2
(45) Date of Patent: Mar. 5, 2019

(54) DOCUMENT LINKING IN AN EMAIL SYSTEM

(71) Applicant: Microsoft Technology Licensing, LLC, Redmond, WA (US)

(72) Inventor: Shahil Soni, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 135 days.

(21) Appl. No.: 15/376,853

(22) Filed: Dec. 13, 2016

(65) Prior Publication Data

US 2018/0165260 A1    Jun. 14, 2018

(51) Int. Cl.

| G06F 17/22 | (2006.01) |
|---|---|
| G06F 17/24 | (2006.01) |
| G06F 3/0482 | (2013.01) |
| H04L 12/58 | (2006.01) |
| G06Q 10/10 | (2012.01) |

(52) U.S. Cl.
CPC ........ *G06F 17/2288* (2013.01); *G06F 3/0482* (2013.01); *G06F 17/2235* (2013.01); *G06F 17/24* (2013.01); *G06Q 10/107* (2013.01); *H04L 51/08* (2013.01)

(58) Field of Classification Search
CPC .................................................. G06F 17/2288
USPC ......................................................... 715/205
See application file for complete search history.

(56) References Cited

U.S. PATENT DOCUMENTS

| 6,405,225 B1 | 6/2002 | Apfel et al. | |
|---|---|---|---|
| 8,108,464 B1* | 1/2012 | Rochelle | H04L 51/00 709/204 |
| 2005/0033811 A1 | 2/2005 | Bhogal et al. | |
| 2010/0036917 A1* | 2/2010 | McCaffrey | G06Q 10/107 709/206 |
| 2010/0058176 A1* | 3/2010 | Carro | G06F 9/543 715/256 |
| 2010/0131523 A1* | 5/2010 | Yu | G06Q 10/107 707/756 |
| 2012/0278401 A1* | 11/2012 | Meisels | G06F 17/24 709/206 |
| 2013/0117376 A1 | 5/2013 | Filman et al. | |

(Continued)

FOREIGN PATENT DOCUMENTS

| EP | 1932086 A1 | 6/2008 |
|---|---|---|
| WO | 2012149506 A2 | 11/2012 |

OTHER PUBLICATIONS

Lawler, Rebecca, "Introducing a new way to share files with Outlook Web App", https://blogs.office.com/2014/10/08/introducing-new-way-share-files-outlook-web-app/, Published on: Oct. 8, 2014, 8 pages.

(Continued)

*Primary Examiner* — Frank D Mills
(74) *Attorney, Agent, or Firm* — Christopher J. Volkmann; Kelly, Holt & Christenson, PLLC

(57) ABSTRACT

A pasting operation is detected in which a user copies and pastes content from a source document into an email message. A link from the pasted content to the source document is created and the content is marked as linked content in the email message. A responsive email message, that contains a modified version of the linked content, is detected and a user actuatable element is surfaced, which can be actuated in order to automatically store the modified version of the linked content into the source document.

20 Claims, 17 Drawing Sheets

(56) References Cited

U.S. PATENT DOCUMENTS

| | | |
|---|---|---|
| 2013/0174031 A1 | 7/2013 | Constantinou |
| 2015/0143211 A1 | 5/2015 | Kaufthal et al. |
| 2015/0154156 A1 | 6/2015 | Meyers, Jr. et al. |
| 2015/0199411 A1* | 7/2015 | Greenspan ........ G06F 17/30548 715/229 |
| 2016/0034427 A1 | 2/2016 | Pathak |
| 2016/0241499 A1 | 8/2016 | Hailpern et al. |

OTHER PUBLICATIONS

"Share Files via Link", https://help.salesforce.com/apex/HTViewHelpDoc?id=collab_files_sharing_via_link.htm&language=en, Published on: Mar. 20, 2015, 2 pages.

Collins, Barry, "Word for iPad: Top 10 tips", http://www.itpro.co.uk/mobile/22799/word-for-ipad-top-10-tips, Published on: Jul. 30, 2014, 6 pages.

Paul, Ian, "Top 15 Cloud Storage Tips and Tasks", http://www.pcworld.com/article/255072/top_15_cloud_storage_tips_and_tasks.html, Published on: May 6, 2012, 6 pages.

Matthews, Steve, "Link into a single paragraph within a Google Doc", http://www.stemlegal.com/strategyblog/2013/link-into-a-single-paragraph-within-a-google-doc/, Published on: May 31, 2013, 4 pages.

Concepcion, Anne-Marie, "In Design Secrets: How to place and link text—without its formatting", https://www.lynda.com/articles/indesign-secrets-how-to-place-and-link-text-without-its-formatting, Published on: Jun. 13, 2013, 4 pages.

Ni, et al., "An Access Control Language for a General Provenance Model", In Proceedings of the 6th VLDB Workshop on Secure Data Management, Aug. 28, 2009, pp. 68-88.

"International Search Report & Written Opinion Issued in PCT Application No. PCT/US17/064981", dated Mar. 26, 2018, 13 Pages.

Puttaswamy, et al., "Docx2Go: Collaborative Editing of Fidelity Reduced Documents on Mobile Devices", In Proceedings of the 8th International Conference on Mobile Systems, Applications, and Services, Jun. 15, 2010, pp. 345-356.

* cited by examiner

DOCUMENT LINKING IN AN EMAIL SYSTEM

BACKGROUND

Computing systems are currently in wide use. Some such computing systems include electronic mail (email) computing systems as well as document authoring and management computing systems, among others.

Email computing systems allow users to perform email functionality. Email functionality can include such things as authoring email messages, sending, receiving and opening email messages, sending and receiving attachments, arranging folders and filters, among a wide variety of other things.

Document authoring and management computing systems can include applications that allow a user to author, read, edit, and revise a document. Such applications can include word processing applications, spreadsheet applications, slide presentation applications, collaborative applications that allow two or more users to collaborate on a document, among others. Document management computing systems can include one or more data stores and accessing logic that allow users to store documents on the data store, retrieve documents from the data store, search through documents, share documents, manage permissions, among a wide variety of other things.

It is not uncommon for users of email systems to copy and paste a portion of a document into an email message and send that email message to a group of recipients, so the recipients can contribute modifications to the pasted text. The sender of the email message can then obtain suggestions as to how the pasted text can be modified, from the recipients of the email message. These suggestions are often received in responsive email messages in which a recipient copies and pastes the text from the original email message, into the responsive email message, and then modifies or otherwise edits the text, before sending the responsive email message back to the original sender of the original email message.

The discussion above is merely provided for general background information and is not intended to be used as an aid in determining the scope of the claimed subject matter.

SUMMARY

A pasting operation is detected in which a user copies and pastes content from a source document into an email message. A link from the pasted content to the source document is created and the content is marked as linked content in the email message. A responsive email message, that contains a modified version of the linked content, is detected and a user actuatable element is surfaced, which can be actuated in order to automatically store the modified version of the linked content into the source document.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
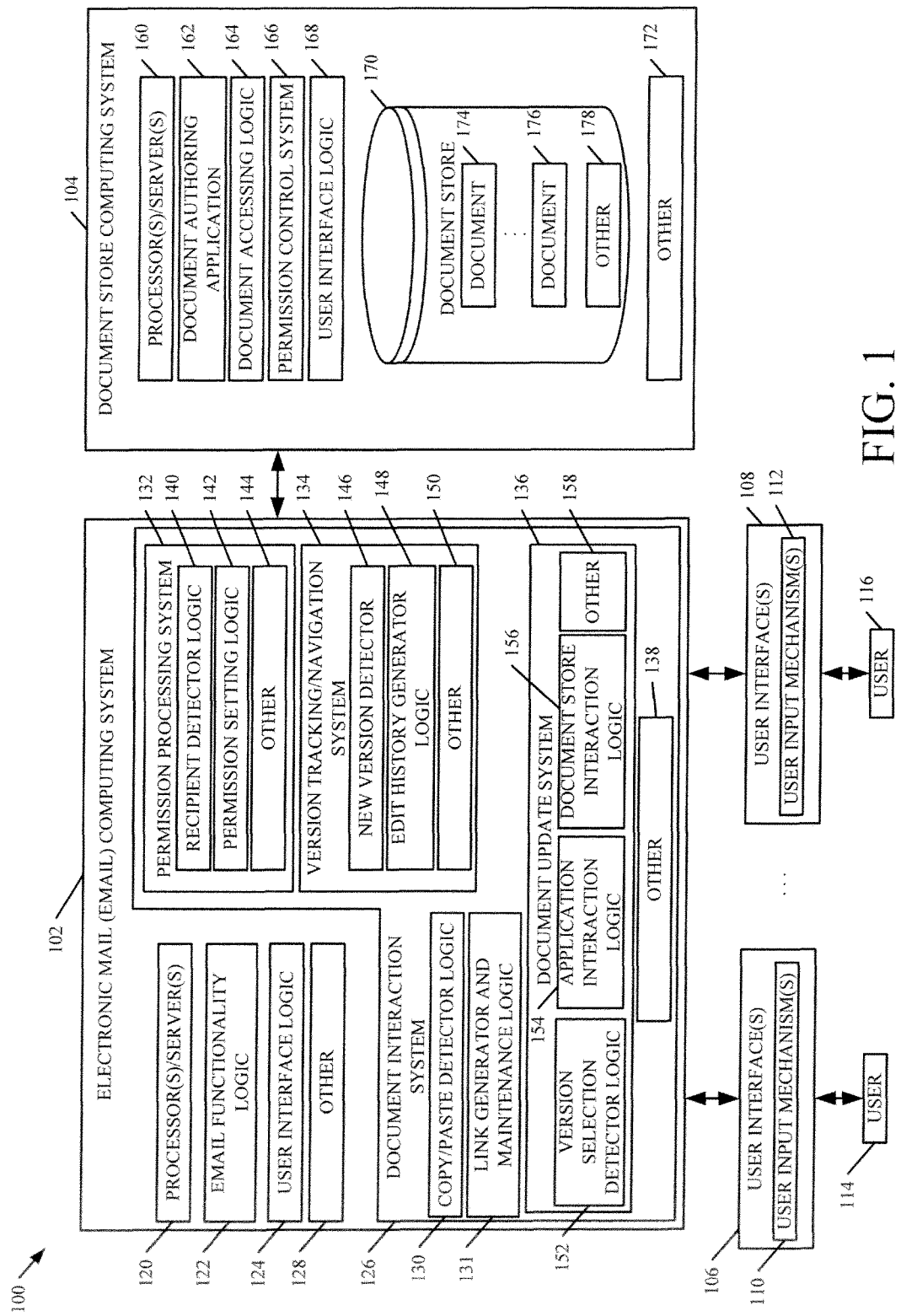
FIG. 1 is a block diagram of one example of a computing system architecture.

FIG. 1 is a block diagram of one example of a computing system architecture 100. Architecture 100 illustratively includes electronic mail (email) computing system 102 and document store computing system 104. In the example show in FIG. 1, email computing system 102 illustratively generates user interfaces 106-108, with user input mechanisms 110-112, for interaction by users 114-116. Users 114-116 can interact with user input mechanisms 110-112, respectively, in order to control and manipulate email computing system 102. In one example, document store computing system 104 can also generate user interfaces with user input mechanisms for interaction by users 114-116, so that users 114-116 can control and manipulate document store computing system 104 as well. However, for the sake of example, FIG. 1 only shows that email computing system 102 is generating the user interfaces 106-108.

Email computing system 102 can include one or more processors or servers 120, email functionality logic 122, user interface logic 124, document interaction system 126, and it can include other items 128. Email functionality logic 122 illustratively performs email functionality, and exposes (such as through user interface logic 124) the user interfaces 106-108 so that the users 114-116 can perform email functions in email computing system 102. Those email functions can include a wide variety of functions, such as authoring, receiving and responding to email messages, attaching documents and accessing attachments, arranging folders and configuring filters, among a wide variety of other things.

Document interaction system 126 illustratively allows a user to copy and paste a portion of a document into an original email message and then to receive new versions of that content from recipients of the original email message, in responsive messages. It also allows the sender of the original email message to select one of those versions and automatically save it to the source document, from which it was originally copied.

In the example shown in FIG. 1, document interaction system 126 illustratively includes copy/paste detector 130, link generator and maintenance logic 131, permission processing system 132, version tracking/navigation system 134, document update system 136, and it can include a wide variety of other items 138. Permission processing system 132, itself, includes recipient detector logic 140, permission setting logic 142, and it can include other items 144. Version tracking/navigation system 134 illustratively includes new version detector 146, edit history generator logic 148, and it can include other items 150. Document update system 136 can include version selection detector logic 152, application interaction logic 154, document store interaction logic 156, and it can include other items 158.

Also, in the example shown in FIG. 1, document store computing system 104 can include one or more processors or servers 160, document authoring application 162 (although this can be located anywhere in computing system architecture 100 or anywhere that is accessible by computing system architecture 100), document accessing logic 164, permission control system 166, user interface logic 168, document store 170, and it can include other items 172. Document store 170 can include documents 174-176. It can also include a wide variety of other items 178 (such as permission information, metadata, index information and a wide variety of other items).

Before describing the overall operation of architecture 100 in more detail, a brief overview of some of the items in architecture 100, and their operation, will first be provided. Document interaction system 126 illustratively allows a user (such as user 114) to cut and paste a portion of the content of a document into an email message and send it to a set of recipients to receive suggestions or modifications to that content. Link generator and maintenance logic 131 marks that content as linked content and links it to the source document (such as document 174) in document store computing system 104. When user 114 receives responsive messages containing different versions of the linked content, system 134 allows user 114 to select one of those versions and system 136 automatically modifies document 174 to contain the new version of the linked content.

More specifically, in one example, copy/paste detector logic 130 illustratively detects when user 114 copies content from a document 174 and pastes it into an email message. Link generator and maintenance logic 131 illustratively links that content to its source document and maintains that link in the various email messages that are sent to the recipients and responsive messages that are received from the recipients.

Permission processing system 132 illustratively processes the permissions in the source document 174 based upon the recipients of the email message. This can be done so that those recipients now have access to the source document.

Version tracking/navigation system 134 illustratively tracks the different versions of the linked content and allows user 114 to view an edit history, or an aggregated set of responsive messages that contain different versions of the linked content. Document update system 136 illustratively generates user interfaces that have user input mechanisms that user 114 can actuate to select one of the marked-up versions of the linked content, and application interaction logic 154 can also surface user input mechanisms that allow user 114 to work on the document using document authoring application 162 in document store computing system 104. Document store interaction logic 156, based upon version selection detector logic 152 detecting that user 114 has selected a version to be included in the source document, interacts with document accessing logic 164 in document store computing system 104 to modify the source document 174 so that it now contains the selected version which was selected by user 114.

Figure 2A:
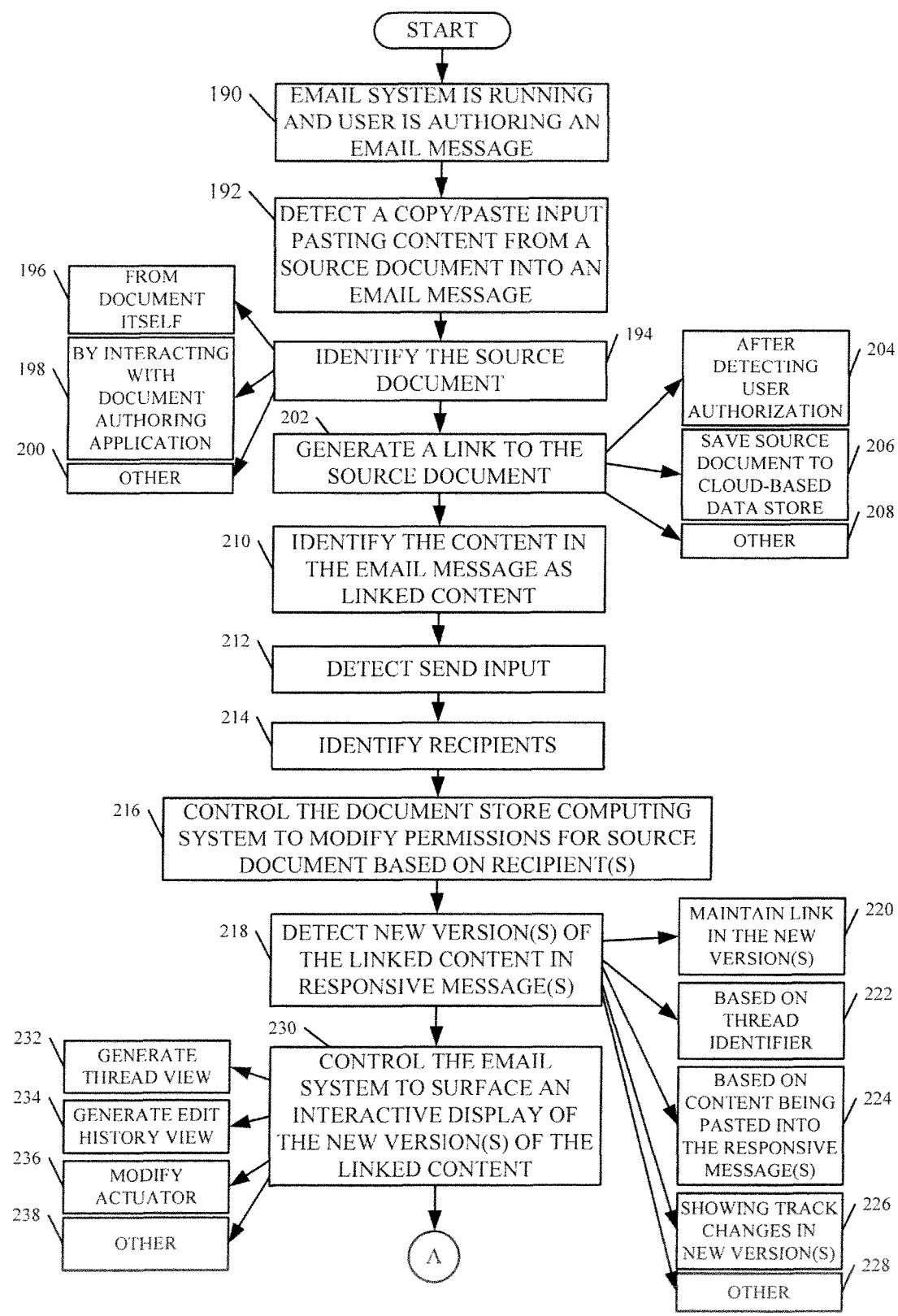
FIGS. 2A and 2B (collectively referred to herein as FIG. 2) show a flow diagram illustrating one example of the operation of the architecture illustrated in FIG. 1.
Figure 2B:
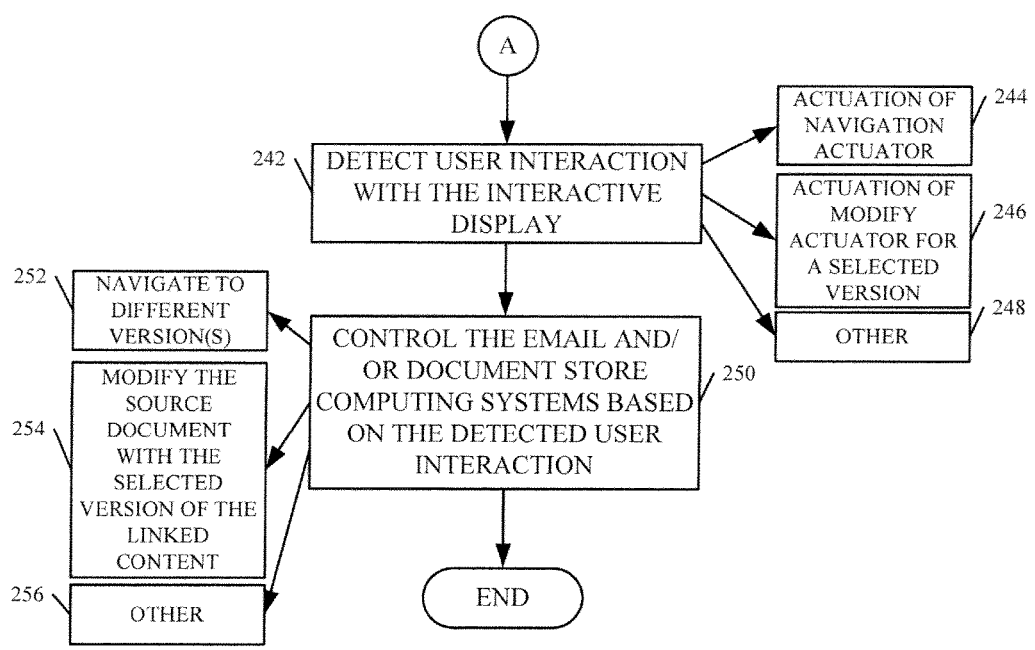

FIGS. 2A and 2B (collectively referred to as FIG. 2) show a flow diagram illustrating one example of the operation of the architecture shown in FIG. 1 in generating a link to a source document where content from the source document has been copied and pasted into an email message.

It is first assumed that email system 102 is running and open and that user 114 is authoring an email message. The email message may be an original email message, a reply, etc. This is indicated by block 190 in the flow diagram of FIG. 2.

Copy/paste detector logic 130 illustratively detects a copy/paste input in which user 114 pastes content from a source document 174 into the email message that user 114 is drafting. This is indicated by block 192. This can be done in a variety of different ways. For instance, the user 114 is illustratively using application interaction logic 154, that interacts with document authoring application 162 (which may be, for instance, a word processing application, a spreadsheet application, a slide presentation application, etc.) in manipulating a document. When the user uses the copy/paste actuators surfaced through the application 162, then application interaction logic 154 may detect this and provide an indication to copy/paste detector logic 130 that the user has copied text from a source document. Copy/paste detector logic 130 can then detect when the user pastes that content into the email message being authored, and application interaction logic 154 can also provide an identifier, identifying source document 174, identifying where it is located, etc.

Identifying the source document is indicated by block 194 in the flow diagram of FIG. 2. This can be done by detector logic 130 interacting with the document 174, itself, as indicated by block 196, or by interacting with the document authoring application either directly or through application interaction logic 154, as discussed above, and as indicated by block 198. The document can be identified in other ways as well, and this is indicated by block 200.

Copy/paste detector logic 130 then provides an indication to link generator and maintenance logic 131 indicating that a link may need to be generated for the source document. Logic 131 also obtains the identity of the source document, from logic 130, from the document itself, or from another component or item in architecture 100. Generating a link to the source document is indicated by block 202 in the flow diagram of FIG. 2.

In one example, logic 131 can surface an indication to the user, prompting the user to indicate whether user 114 wishes this to be marked as linked content. It can then generate the link after the user interacts with logic 131, authorizing the content to be identified as linked content. This is indicated by block 204. When the link is generated, link generator and maintenance logic 131 can use document store interaction logic 156 to store the document 174 to a cloud-based data store (such as document store 170) if it is not already stored there. This is indicated by block 206. In this way, the document may be accessible to other items in architecture 100, to the recipients of the email message being authored, or it may be more widely available to other persons or systems as well. The link can be generated in other ways as well, and this is indicated by block 208.

Link generator and maintenance logic 131 then generates a user interface element identifying the content in the email message as linked content. This is indicated by block 210. Email functionality logic 122 then detects a user send input indicating that user 114 has sent the email message to the recipients of the email message. This is indicated by block 212. Recipient detector logic 140 in permission processing system 132 then identifies the recipients of the email message (such as by reading from the "To", "CC" and "BCC" fields from the email message). Identifying the email recipients is indicated by block 214. Permission setting logic 142 then controls the permission control system 166 and document store computing system 104 in order to modify the permissions for source document 174 based on the identified recipients. This is indicated by block 216.

Assuming that user 116 is one of the recipients, user 116 may generate a responsive message in which user 116 copies and pastes the linked content from the original email message sent by user 114, into the responsive message being authored by user 116. In doing so, link generator and maintenance logic 131 maintains the link when the content is copied and pasted. New version detector 146 in version tracking/navigation system 134 then detects that a new version of the linked content is being generated in the responsive message. Email functionality logic 122 detects that the responsive message has been received in the inbox of user 114. When this occurs, new version detector 146 detects that there is now a new version of the linked content in the inbox for user 114. Detecting the new version of the linked content in a responsive message is indicated by block 218 in the flow diagram of FIG. 2. Maintaining the link in the new version is indicated by block 220 in the flow diagram of FIG. 2.

New version detector 146 can detect that the responsive message is in the same thread as the original message based on a thread identifier as indicated by block 222. It can detect that the new version is being created based upon detection of the linked content being pasted into the responsive message as indicated by block 224. In one example, the new version will include track changes so that user 114 can easily see the modifications that were made by user 116. Showing tracked changes in the new version is indicated by block 226. The new version of the linked content in a responsive message can be detected in other ways as well, and this is indicated by block 228. It will also be noted that, where there were multiple recipients to the original message, there may be multiple new versions of the linked content that are identified in different responsive messages from those multiple recipients.

At some point, user 114 will wish to view the new versions of the linked content. In that case, edit history generator logic 148 can (either automatically or in response to a user input) generate a view showing the edit history (or the multiple new versions) of the linked content. It controls user interface logic 124 in email system 102 to surface an interactive display of the new versions of the linked content. This is indicated by block 230 in the flow diagram of FIG. 2. It can do this by generating a thread-based view in which the conversation thread that contains the new versions is displayed for user 114. This is indicated by block 232. It can generate an edit history view, in which only the email messages that contain new versions, in the conversation thread, are surfaced for the user. This can be done by identifying those email messages in the conversation threads that contain a version of the linked content, aggregating those messages and then displaying the messages, or just the different versions themselves, for user interaction. Generating an edit history view is indicated by block 234 in the flow diagram of FIG. 2.

The different versions may each have an associated author, who authored that particular version of the linked content (or modified it), a date and time that the new version was received, and it may include a wide variety of other data or metadata as well. In one example, each version also has a corresponding modify actuator that is displayed for user interaction. The modify actuator, when actuated by the user, will cause document update system 136 to update the source document 174 from which the linked content was copied, with the corresponding version of the linked content. Displaying the various different versions with a modify actuator is indicated by block 236 in the flow diagram of FIG. 2. Controlling the email system to surface an interactive display of the new versions of the linked content may be done in other ways as well, and this is indicated by block 238.

Document interaction system 126 then detects any user interaction with the interactive display. This is indicated by block 242 in the flow diagram of FIG. 2. For instance, the edit history view or thread view may have navigation actuators which allow the user to navigate through the various versions of the linked content. Actuation of a navigation actuator is indicated by block 244. As discussed above, each new version may have a modify actuator to select a version that will be used to update the source document. Actuation of the modify actuator for a selected version is indicated by block 246. Other user interactions can be detected in other ways as well, and this is indicated by block 248.

Document update system 136 then controls the email system 102 and/or the document store computing system 104 based on the detected user interaction. This is indicated by block 250 in the flow diagram of FIG. 3. For instance, it can navigate to the different versions of the linked content, when the user actuates a navigation actuator. This is indicated by block 252. Version selection detector logic 152 can detect that the user has selected a version of the linked content that should be used to update the source document 174. Document store interaction logic 156 can then interact with document accessing logic 164 in order to modify document 174 with the new version that has been selected by the user. Controlling the email and/or document store computing system can be done in other ways as well, and this is indicated by block 256.

Figure 3:
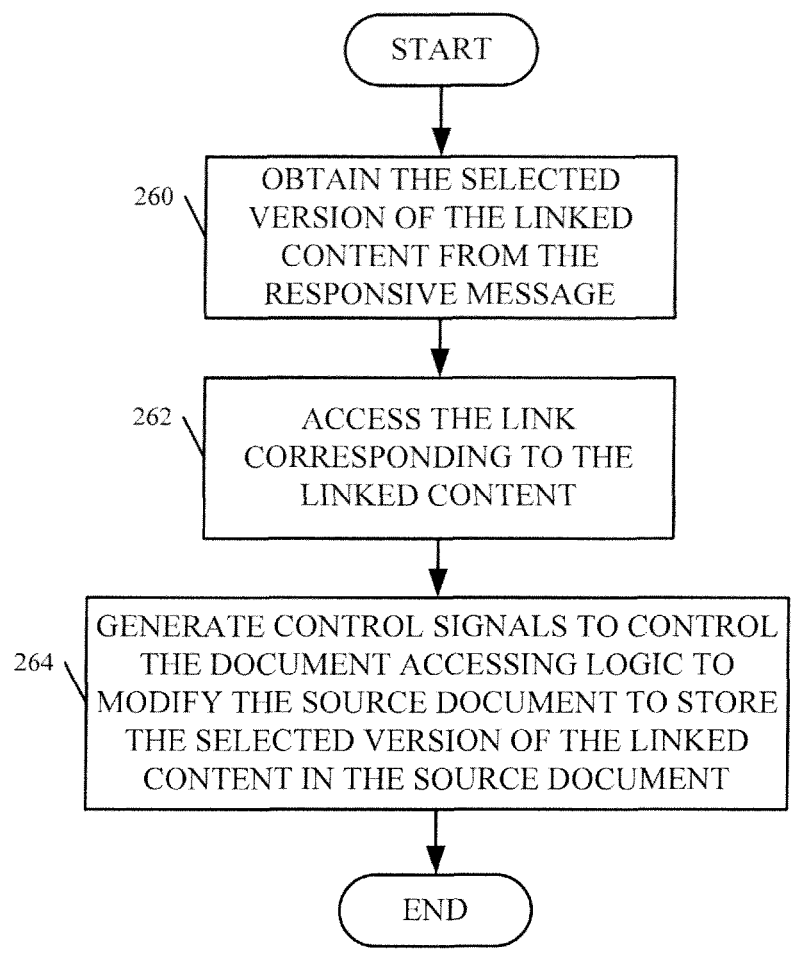
FIG. 3 is a flow diagram illustrating one example of the operation of the architecture shown in FIG. 1, in storing a modified version of linked content into a source document.

FIG. 3 is a flow diagram illustrating one example of how document store interaction logic 156 interacts with document accessing logic 164 in order to modify source document 174 based on a selected version of the linked content. Logic 156 first obtains the selected version of the linked content from the responsive message that contains that version. This is indicated by block 260 in the flow diagram of FIG. 3. It then accesses the link corresponding to the linked content to identify the particular source document 174 from which the content was copied. This is indicated by block 262. It then generates control signals to control the document accessing logic 164 to modify the source document 174 to store the selected version of the linked content in the source document 174. This is indicated by block 264. In one example, this can be done by accessing an application programming interface (API) exposed by document accessing logic 164. In another example, it can be done using control actuators that are exposed by document authoring application 162. Application 162 can then, itself, interact with document accessing logic 164 in order to store the new version in document 174. The control signals to modify source document 174 with the selected version of the linked content can be done in a variety of other ways as well.

Figure 4A:
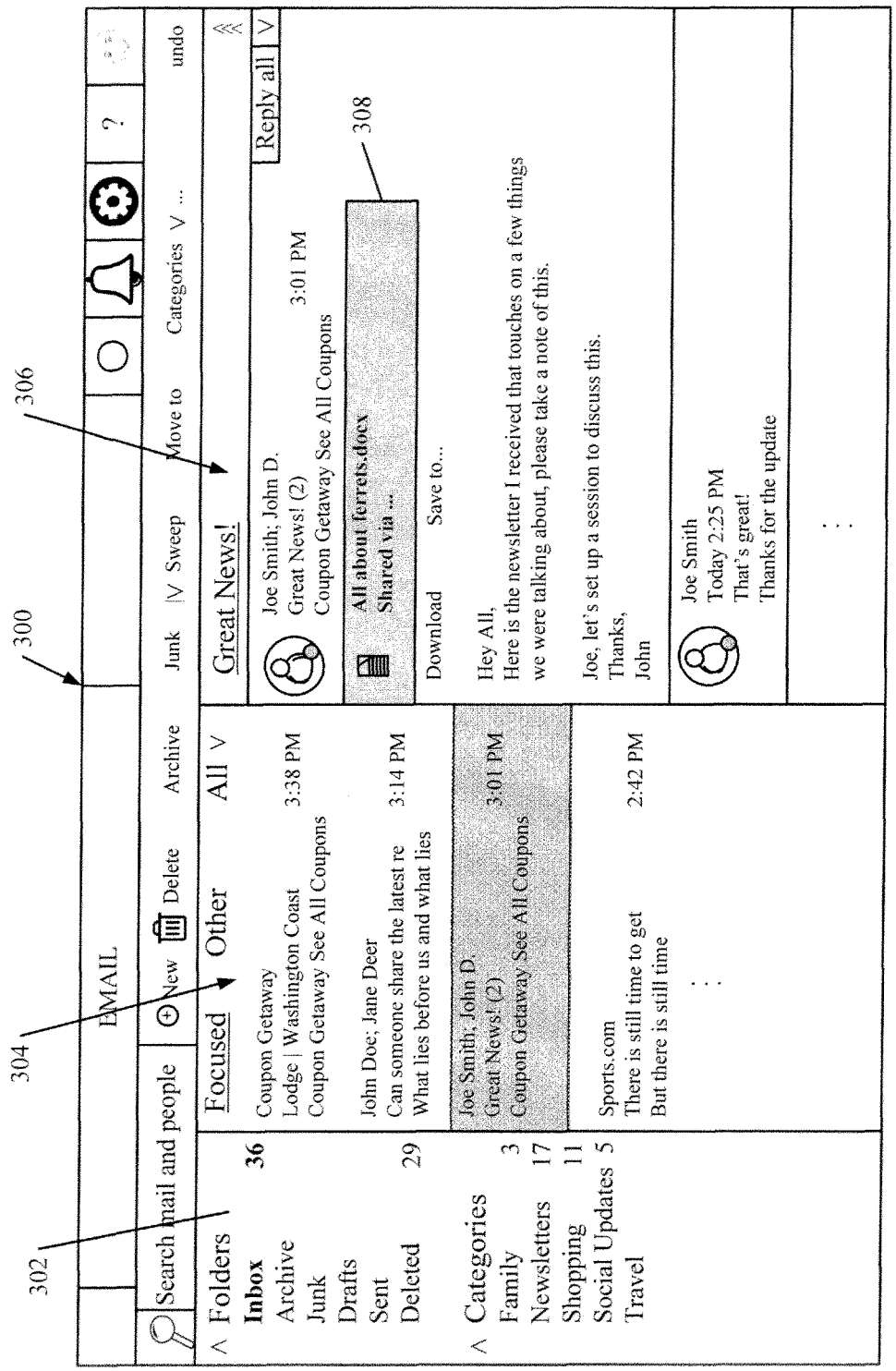
FIGS. 4A-4H show examples of user interface displays that can be generated in the architecture shown in FIG. 1.

FIGS. 4A-4H show examples of user interface displays that can be generated in architecture 100. FIG. 4A shows one example of a user interface display 300 that can be generated by email system 102. It includes a folders pane 302 that shows the various folders (such as the inbox, sent items, deleted items, etc.) for a user (such as user 114). Display 300 also includes a messages pane 304 that shows the various email messages or message threads in the selected folder, that is selected in pane 302. Display 300 also includes a viewing pane 306 that shows the particular email thread selected in pane 304. It can be seen that the message being viewed includes a link 308 to an attached document. When user 114 selects that link 308, then the document can be displayed, in an interactive way, so that user 114 can interact with (e.g., modify, delete, etc.) items in the attached document.

Figure 4B:
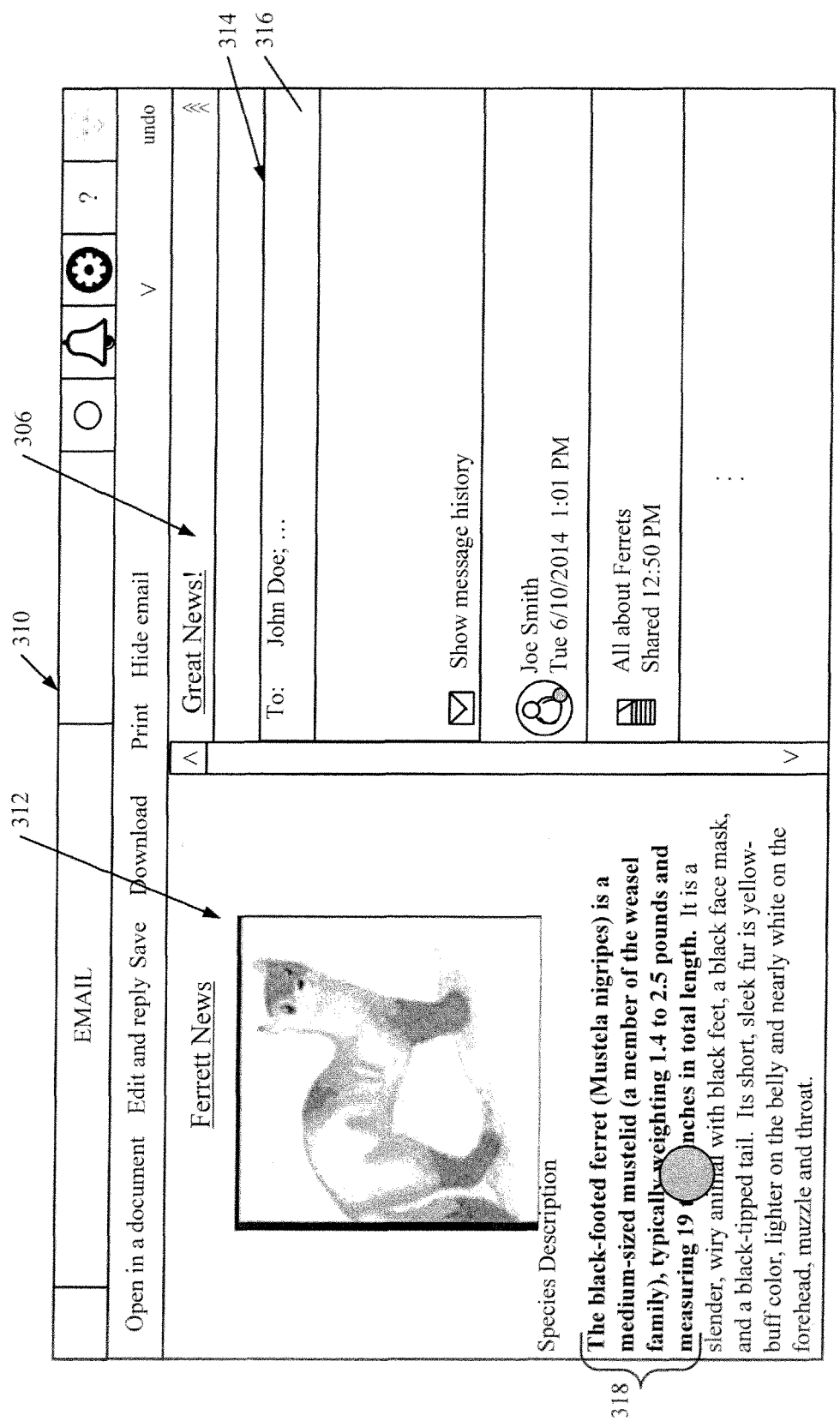
Figure 4C:
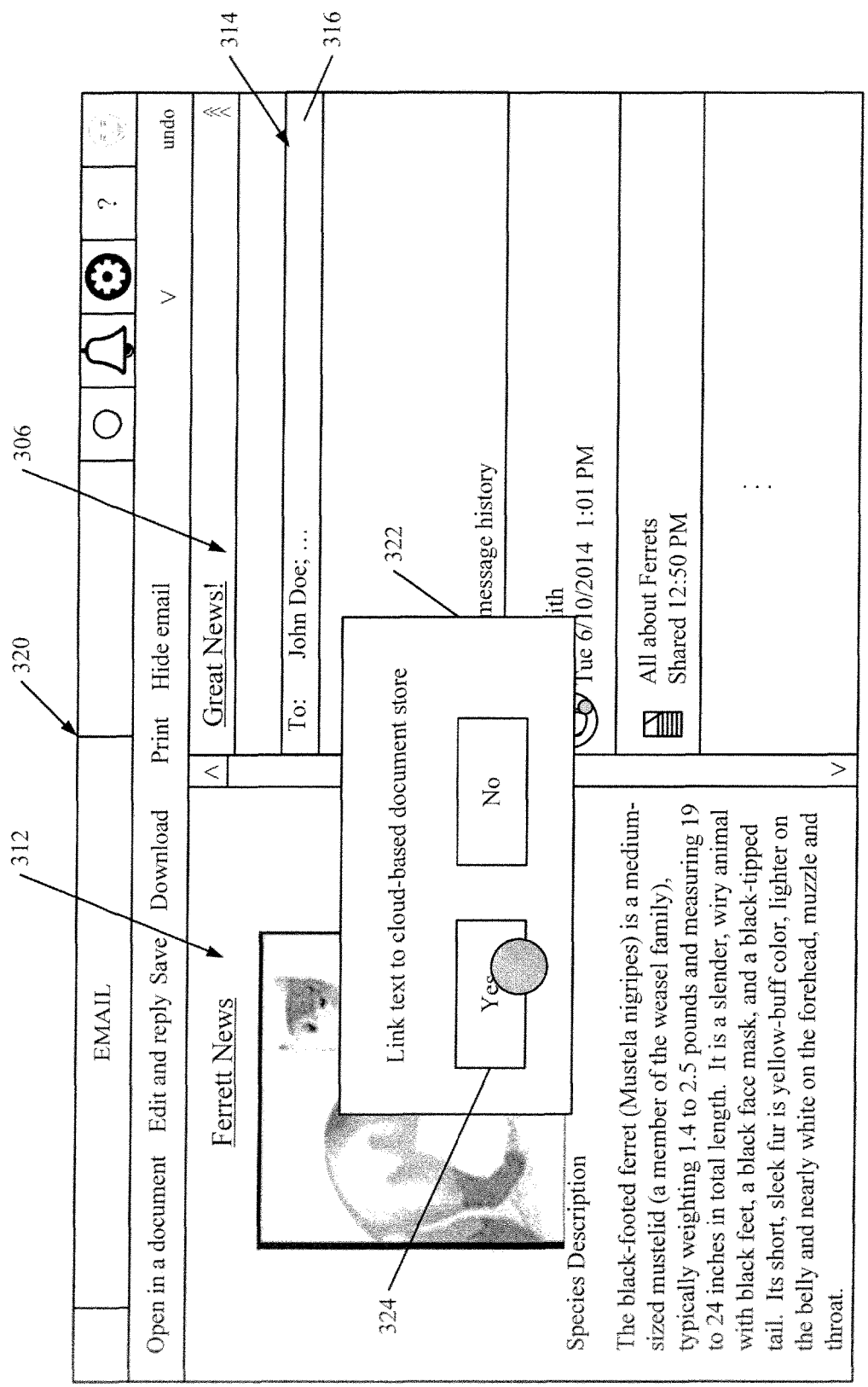

FIG. 4B shows an example of user interface display 310. Display 310 has some similar items to those shown in FIG. 4A, and they are similarly numbered. It can be seen, in display 310, that the attached document linked by link 308 has now been opened and displayed in document pane 312. It can also be seen that user 114 has opened a new email message 314, with a set of recipients identified at 316. It can be further seen that the user has highlighted a portion of text in the source document, and the highlighted portion is generally indicated at 318. When the user executes a copy/paste operation for the highlighted text 318, that text can be pasted by the user into the body of the email message 314. That action is detected by copy/paste detector logic 130. Link generator and maintenance logic 131 then surfaces a user interface display asking whether the user wishes the content, that is about to be pasted into email message 314, should be marked as linked content. FIG. 4C shows one example of this.

Figure 4D:
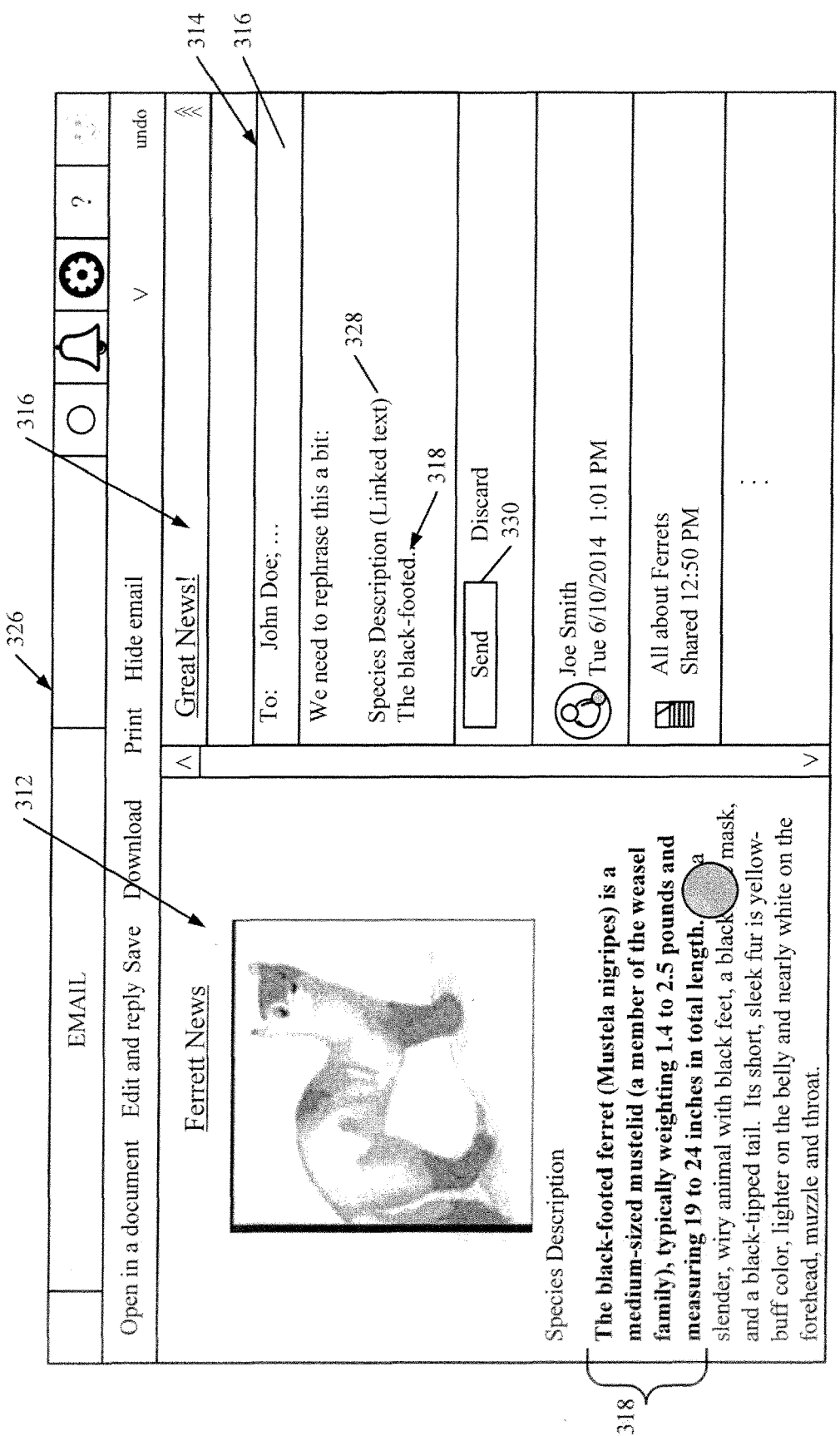

FIG. 4C shows a user interface display 320 which is similar to display 310 shown in FIG. 4B, and similar items are similarly numbered. Display 320, however, now shows that link generator and maintenance logic 131 has surfaced a user interface display element 322 which asks the user whether the copied and pasted content should be marked as linked content, and saved to a cloud-based document store. When the user actuates the yes actuator 324, then link generator and maintenance logic 131 marks the copied and pasted content as linked content in the email message 314. FIG. 4D shows one example of this.

FIG. 4D shows user interface display 326, which is similar, in some ways to display 320 shown in FIG. 4C, and similar items are similarly numbered. However, FIG. 4D now shows that the copied and pasted content 318 is now placed in the email message 314, and it is marked as linked content, such as by the "linked text" designator 328 in the email message.

When the user actuates the send actuator 330, to send the email message 314 to recipients 316, link generator and maintenance logic 131 maintains the link 328 in the email messages sent to the various recipients. Actuating the send actuator is illustrated in FIG. 4E.

Figure 4E:
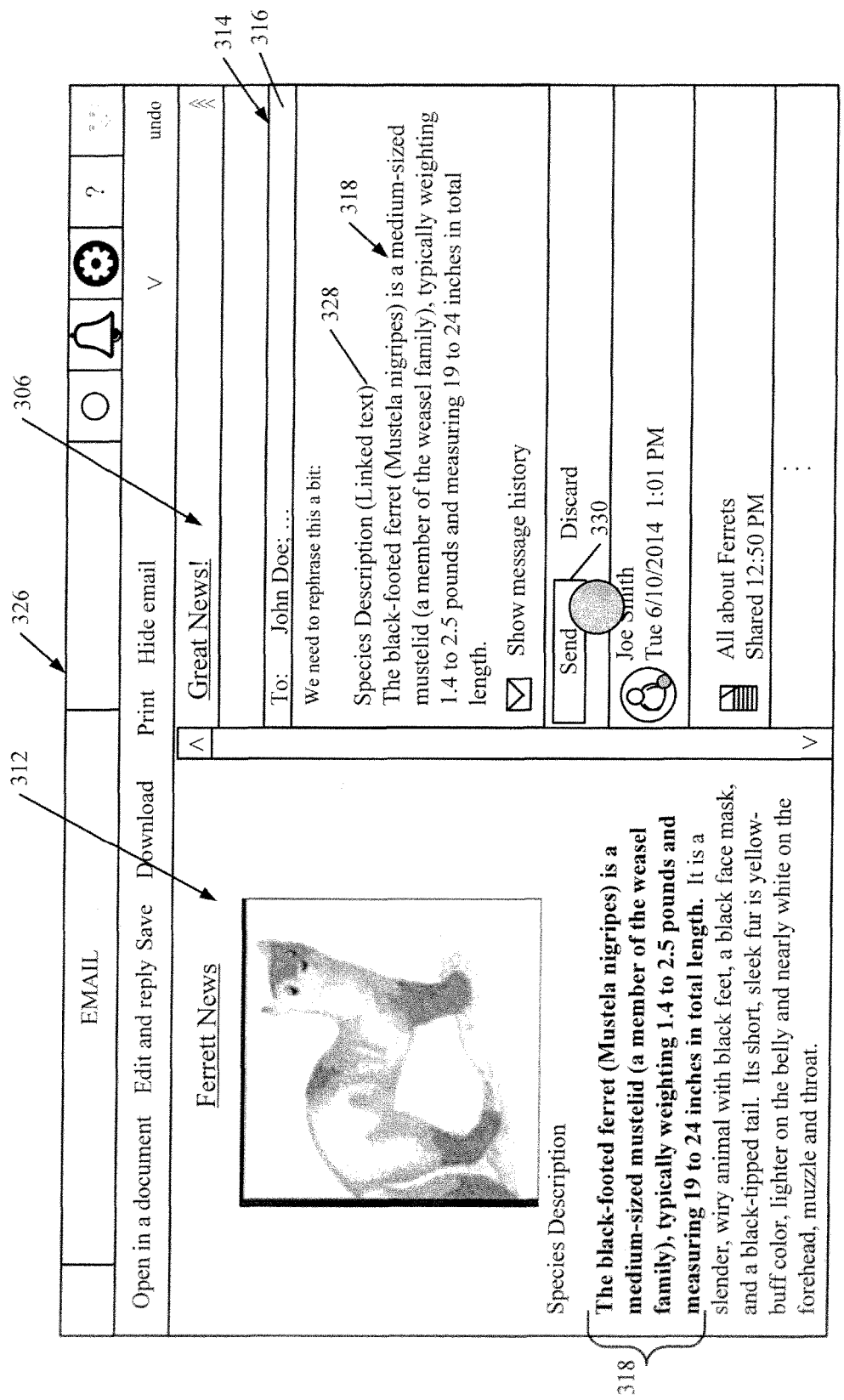

FIG. 4E also illustrates that the linked text is sent in email message 314, without attaching the underlying source document from which the linked text was copied. This allows the recipients 316 to collaborate on that portion of the linked text, without ever having to download the source document, and send it along with the email messages.

Figure 4F:
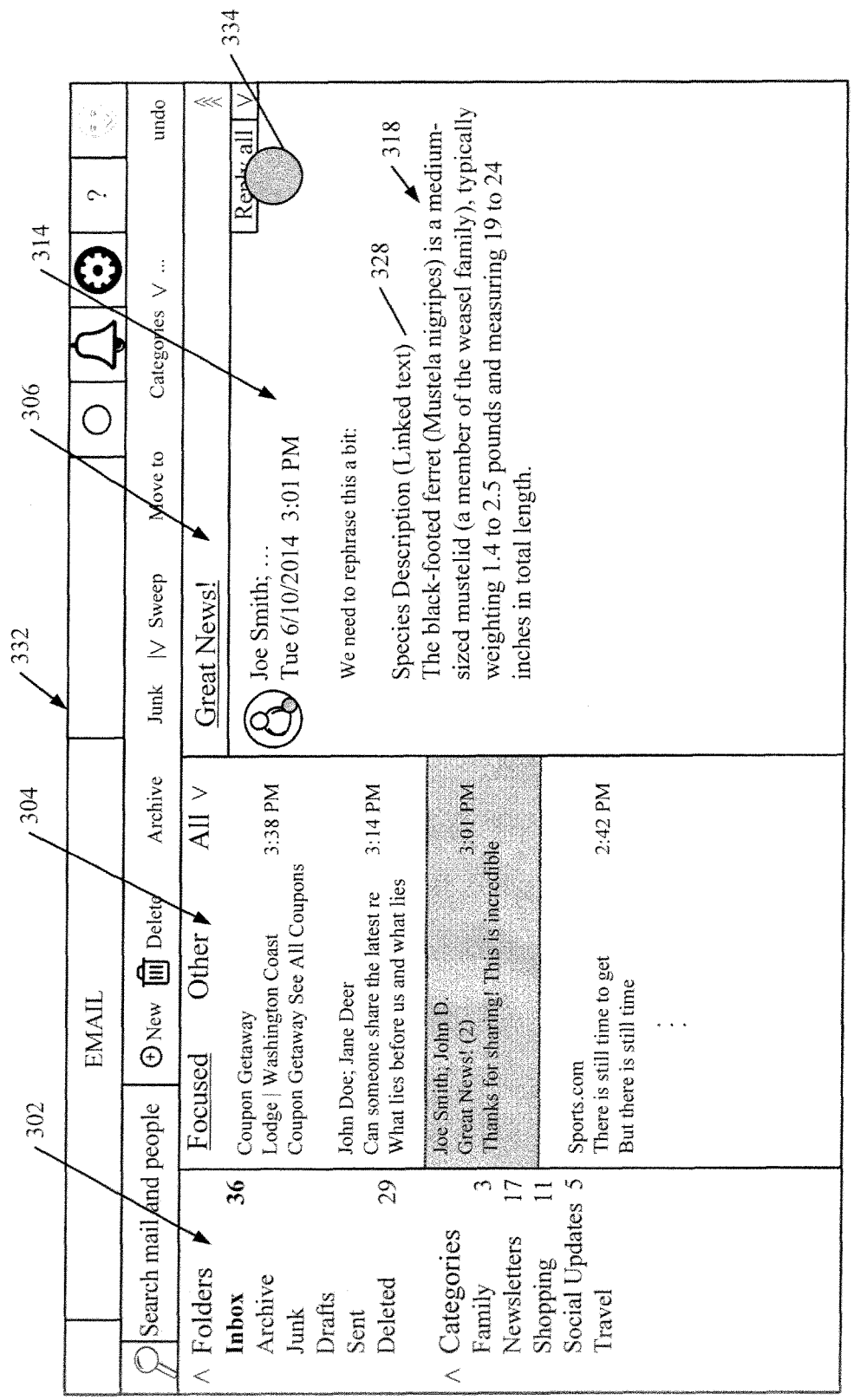
Figure 4G:
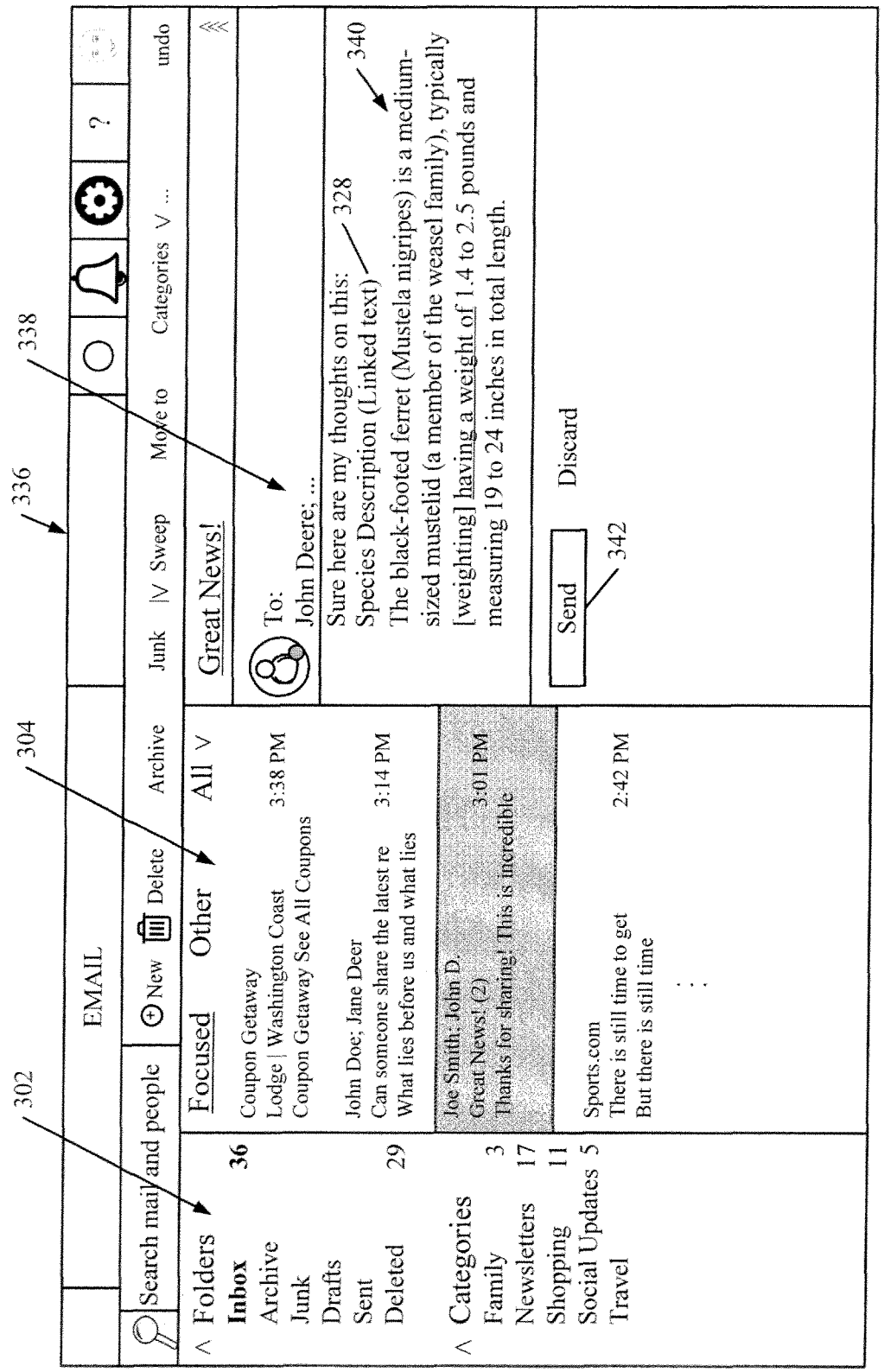

FIG. 4F shows a user interface display 332, that is similar to user interface display 300, shown in FIG. 4A, and similar items are similarly numbered. However, user interface display 332 is illustratively a display that is generated for a recipient 116 of the email message 314 that was generated by user 114. It can be seen in FIG. 4F that user 116 has now opened the email message 314 which shows the copied and pasted text 318 along with the designator 328 indicating that it is linked content. FIG. 4F shows that recipient 116 is also actuating the "reply all" actuator 334 to generate a responsive message. When this is done, email functionality logic 122 generates a responsive email message so that the user can author a response. FIG. 4G shows one example of this.

FIG. 4G is similar to FIG. 4F, and similar items are similarly numbered. However, FIG. 4G shows user interface display 336 in which a responsive email message 338 is being authored by user 116. It can also be seen that the user has copied and pasted text 318 into email message 338, and has modified that text as shown generally at 340. Link generator and maintenance logic 131 maintains the link designator 328, showing that the content is linked content, and new version detector 146 will now detect that a new version of the linked content has been generated by user 116 in a responsive message. When user 116 actuates send actuator 342, message 338 is sent to the recipients (including the original sender 114), and message 338 includes the new version 340 of the linked content 318.

Figure 4H:
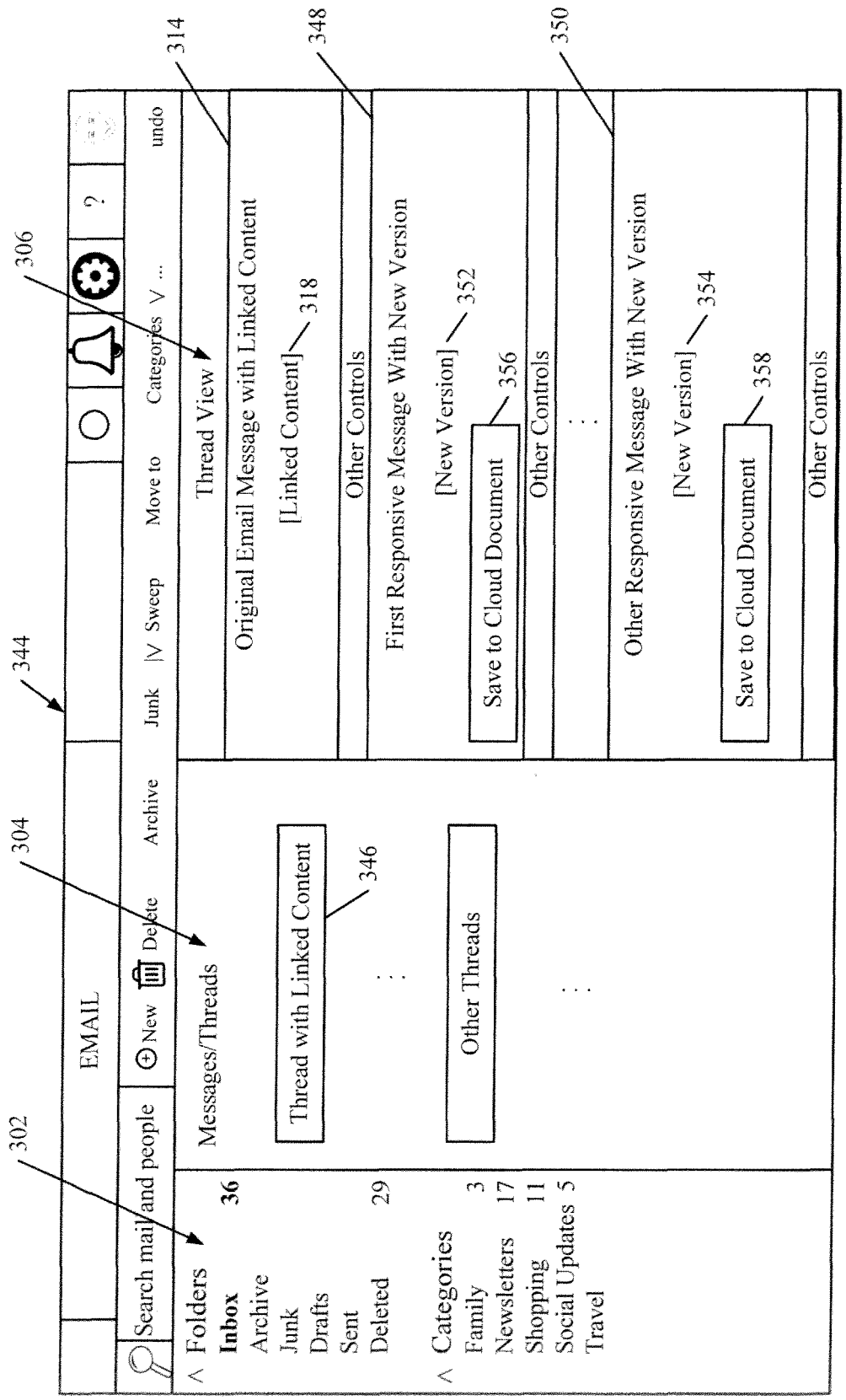

At some point, user 114 will wish to review the various new versions generated by the recipients of the original email message that included the linked content 318. In that case, edit history generator logic 148 detects a user input indicating this, and generates a view showing the new versions. Again, as described above with respect to FIG. 2, it can be a thread-based view, an edit history view showing only the new versions of the linked content, or it can be another view. FIG. 4H shows one example of this.

FIG. 4H shows a user interface display 344 that is similar to user interface display 300 shown in FIG. 4A, and similar items are similarly numbered. However, FIG. 4H now shows that user 114 has selected a message thread with linked content indicated at 346, in the messages/threads pane 304 of the user's email message display. In that case, pane 306 now shows a view of the various new versions of the linked content. In the example shown in FIG. 4H, pane 306 shows a thread view which includes the original email message 314 that included the linked content 318. It also illustratively shows one or more additional responsive messages 348-350. Each of those responsive messages 348-350 includes a new version 352-354, respectively, of the linked content 318. Also, each of the new versions 352-354 includes a save actuator 356-358, respectively, that can be actuated by user 114. When the user actuates one of the actuators 348-350, version selection detector logic 152 detects that the user has selected one of the new versions for saving to the source document 174. Document store interaction logic 156 then interacts with document store computing system 104 to control computing system 104 so that it modifies the source document 174 to include the selected new version corresponding to the particular actuator 356-358 that was actuated by user 114.

It can thus be seen that the present discussion allows users to collaborate, through email, on a document without ever having to download and attach and send the document with any email messages. This reduces needed bandwidth and computing overhead associated with downloading a document. The system aggregates new versions of linked content, that is linked to the source document, and allows a user to quickly and easily view the new versions and select one of those versions for storage to modify the source document. The system can also automatically modify the source document accordingly and modify permissions based upon recipients of the email message that includes the linked content. It can maintain an edit history or a thread-based view of the new versions, as well.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 5:
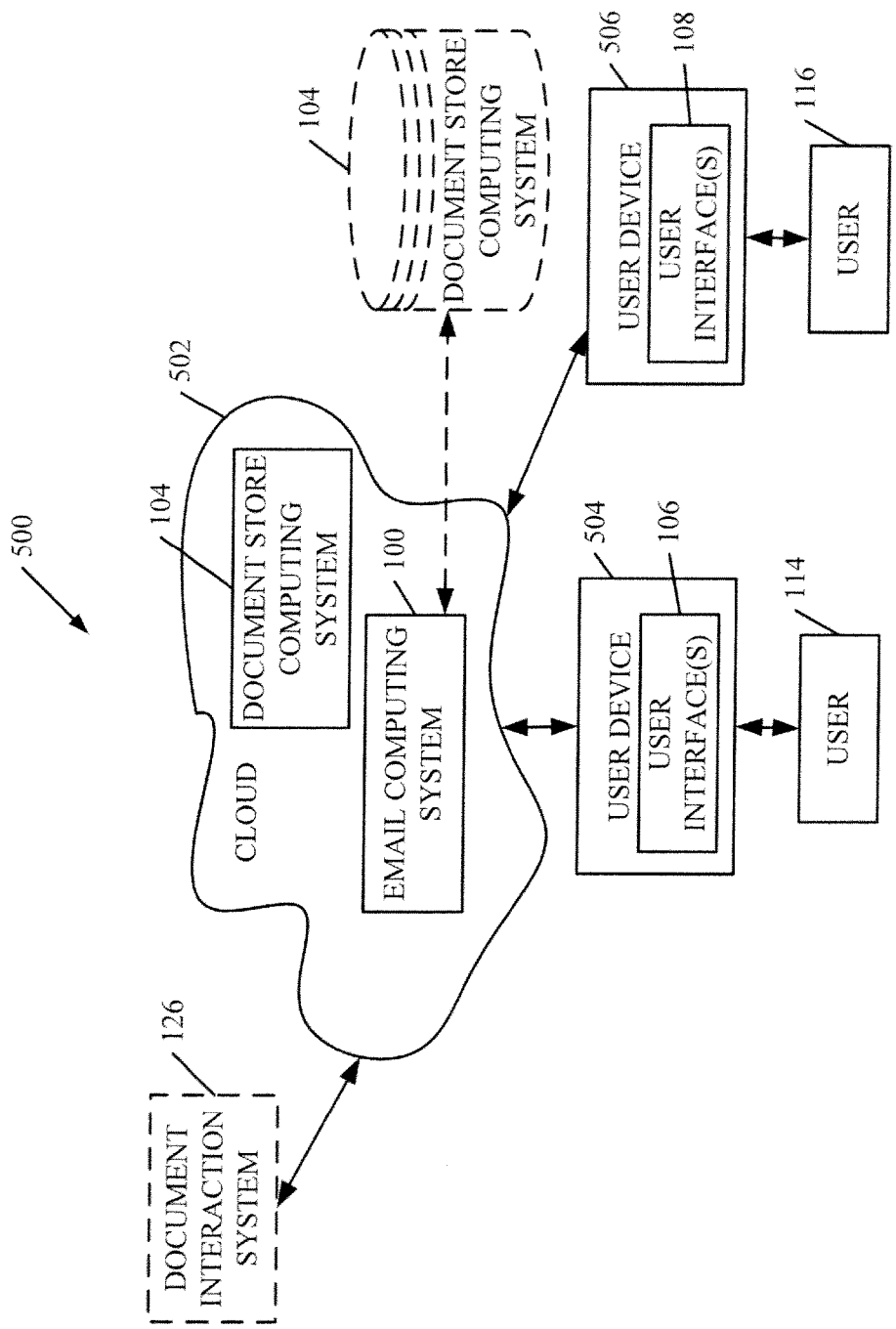
FIG. 5 is a block diagram showing one example of the architecture illustrated in FIG. 1, deployed in a cloud computing architecture.

FIG. 5 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 5, some items are similar to those shown in FIG. 1 and they are similarly numbered. FIG. 5 specifically shows that computing system 102 can be located in cloud 502 (which can be public, private, or a combination where portions are public while others are private). Therefore, users 114-116 use user devices 504-506 to access those systems through cloud 502.

FIG. 5 also depicts another example of a cloud architecture. FIG. 5 shows that it is also contemplated that some elements of architecture 100 can be disposed in cloud 502 while others are not. By way of example, data store computing system 104 can be disposed outside of cloud 502, and accessed through cloud 502. In another example, document interaction system 126 (or other items) can be outside of cloud 502. Regardless of where they are located, they can be accessed directly by devices 504-506, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 6:
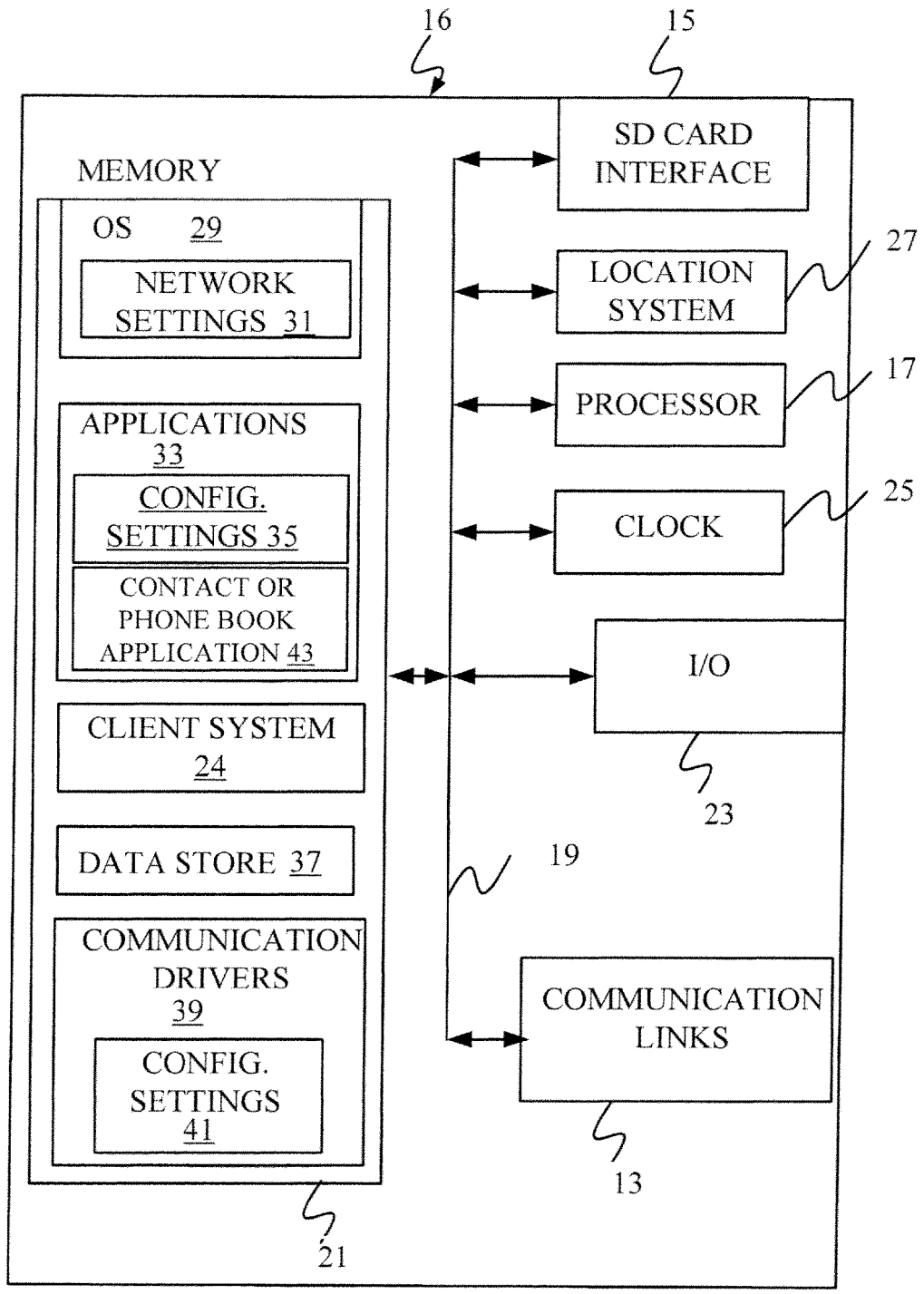
FIGS. 6-8 show examples of mobile devices that can be used in the architectures illustrated in the previous figures.
Figure 7:
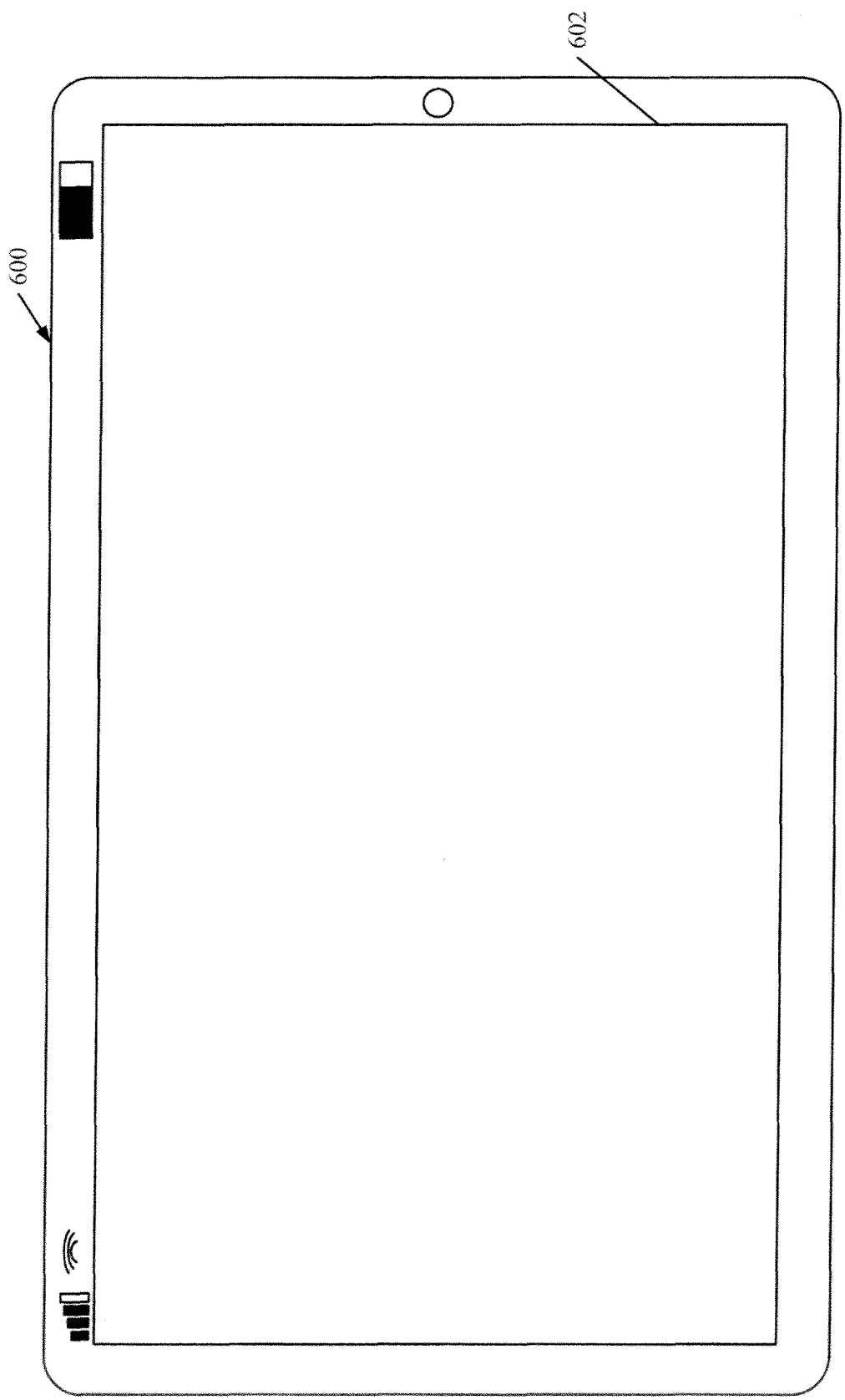
Figure 8:
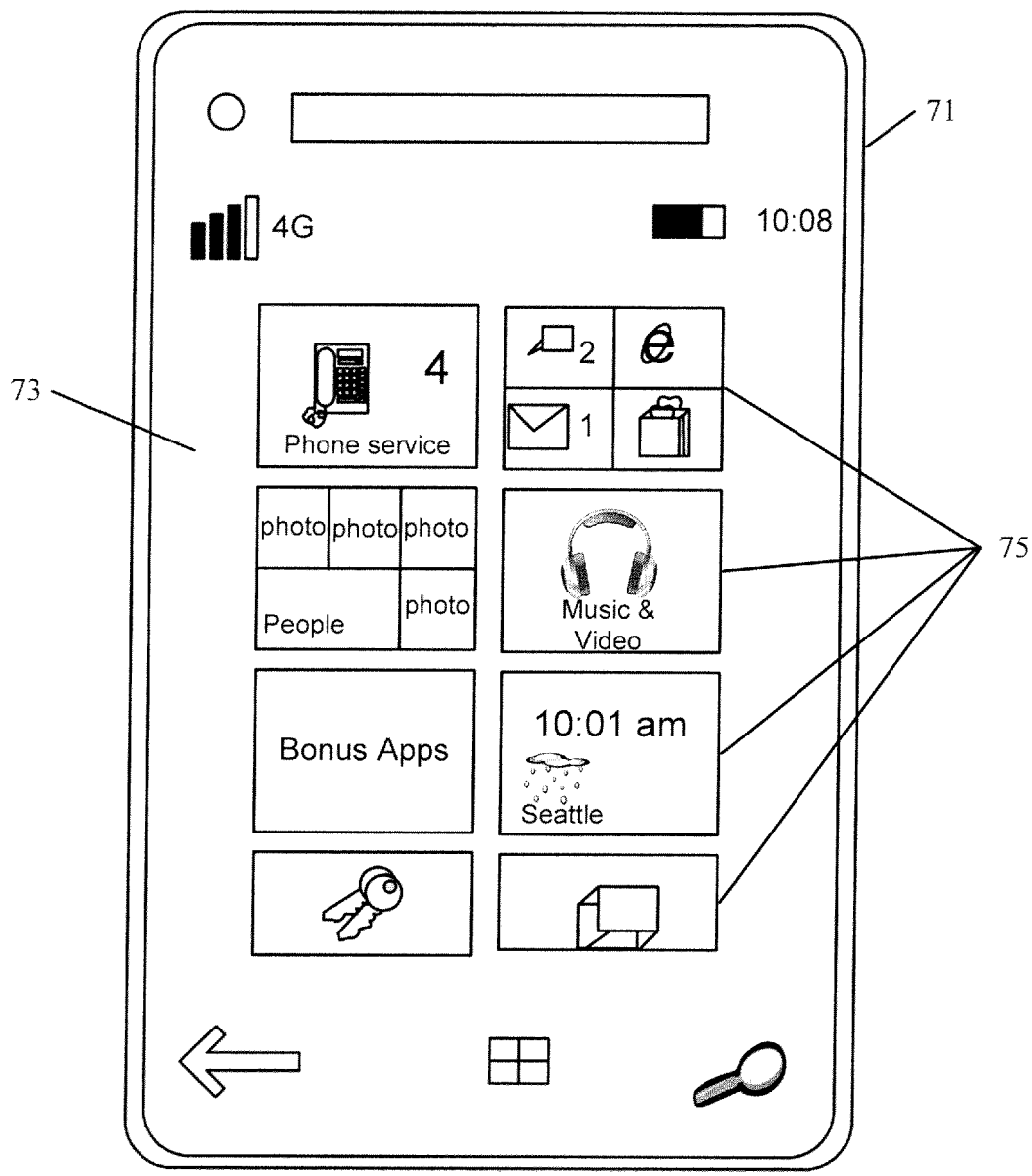

FIG. 6 is a simplified block diagram of one illustrative example of a handheld or mobile computing device that can be used as a user's or client's hand held device 16, in which the present system (or parts of it) can be deployed. FIGS. 7-8 are examples of handheld or mobile devices.

FIG. 6 provides a general block diagram of the components of a client device 16 that can run components of architecture or user devices 504-506 or that interacts with architecture 100, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1xrtt, and Short Message Service, which are wireless services used to provide cellular access to a network, as well as Wi-Fi protocols, and Bluetooth protocol, which provide local wireless connections to networks.

In other examples, applications or systems are received on a removable Secure Digital (SD) card that is connected to a SD card interface 15. SD card interface 15 and communication links 13 communicate with a processor 17 (which can also embody processors or servers 120 or 160 from FIG. 1 or those on user devices 504-506) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client system 24 which can run various applications or embody parts or all of tenant 104. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 7 shows one example in which device 16 is a tablet computer 600. In FIG. 7, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 8 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 9:
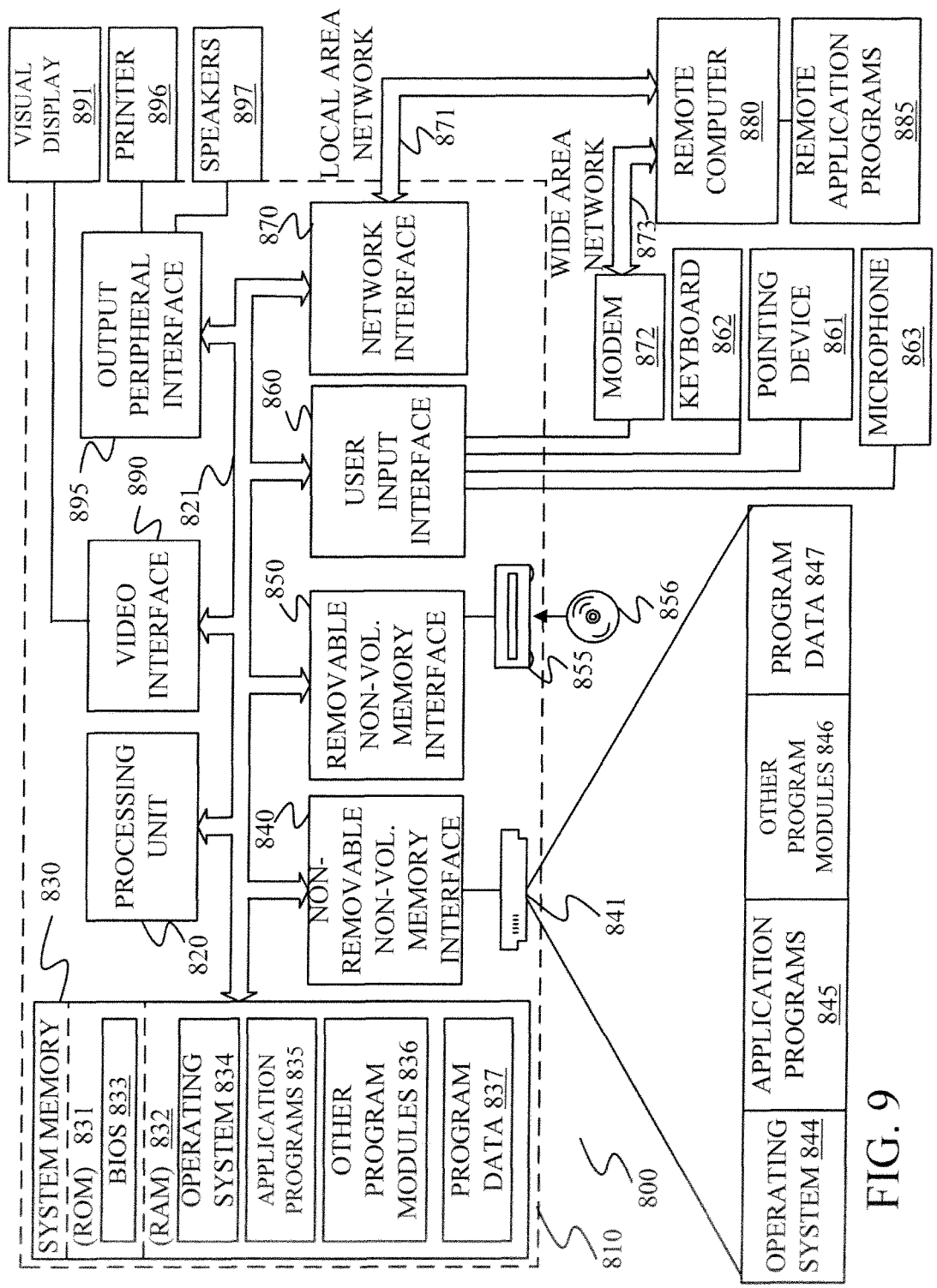
FIG. 9 is a block diagram of one example of a computing environment that can be used in the architectures shown in the previous figures.

FIG. 9 is one example of a computing environment in which architecture 100, or parts of it, (for example) can be deployed. With reference to FIG. 9, an example system for implementing some embodiments includes a general-purpose computing device in the form of a computer 810. Components of computer 810 may include, but are not limited to, a processing unit 820 (which can comprise processor 120, 160 or those on client or user devices 504-506), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 9.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 9 illustrates operating system 834, application programs 835, other program modules 836, and program data 837.

The computer 810 may also include other removable/non-removable volatile/nonvolatile computer storage media. By way of example only, FIG. 9 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 9, provide storage of computer readable instructions, data structures, program modules and other data for the computer 810. In FIG. 9, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 9 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 9 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a computing system, comprising:

electronic mail (email) functionality logic that generates a user interface with an email user input mechanism actuatable to perform email functionality, including authoring and sending a first email message;

paste detector logic that detects pasting of a portion of a source document into a body of the first email message;

link generator and maintenance logic that identifies the pasted portion of the source document as linked content in the first email message; and a document update system that detects user selection of a version of the linked content received in a responsive email message, that is responsive to the first email message, and updates the source document with the selected version of the linked content.

Example 2 is the computing system of any or all previous examples and further comprising:

new version detector logic configured to detect a new version of the linked content received in a responsive email message.

Example 3 is the computing system of any or all previous examples wherein the new version detector logic is configured to detect the new version of the linked content by detecting that the linked content is copied from the first email message into the responsive email message.

Example 4 is the computing system of any or all previous examples and further comprising:

edit history generator logic that generates an edit history view indicative of a plurality of different, selectable, versions of the linked content each received in one of a plurality of responsive email messages.

Example 5 is the computing system of any or all previous examples wherein the document update system comprises:

version selection detector logic that detects user selection of the selected version of the linked content from the edit history view.

Example 6 is the computing system of any or all previous examples wherein the document update system comprises:

document store interaction logic configured to interact with a document store to update the source document with the selected version of the linked content.

Example 7 is the computing system of any or all previous examples and further comprising:

a permission processing system configured to modify permissions corresponding to the source document based on recipients of the first email message.

Example 8 is the computing system of any or all previous examples wherein the permission processing system comprises:

recipient detector logic configured to detect the recipients of the first email message.

Example 9 is the computing system of any or all previous examples wherein the permission processing system comprises:

permission setting logic that sets the permissions corresponding to the source document based on the recipients identified by the recipient detector logic.

Example 10 is a computer implemented method, comprising:

generating a user interface with an email user input mechanism actuatable to perform email functionality, including authoring and sending a first email message;

detecting pasting of a portion of a source document into a body of the first email message;

identifying the pasted portion of the source document as linked content in the first email message; and detecting user selection of a version of the linked content received in a responsive email message, that is responsive to the first email message; and updating the source document with the selected version of the linked content.

Example 11 is the computer implemented method of any or all previous examples and further comprising:

detecting a new version of the linked content received in a responsive email message.

Example 12 is the computer implemented method of any or all previous examples wherein detecting the new version comprises:

detecting the new version of the linked content by detecting that the linked content is copied from the first email message into the responsive email message.

Example 13 is the computer implemented method of any or all previous examples and further comprising:

generating a thread view indicative of a plurality of different, selectable, versions of the linked content each received in one of a plurality of responsive email messages, responsive to the first email message, based on a thread identifier associated with each responsive email message.

Example 14 is the computer implemented method of any or all previous examples wherein updating the source document comprises:

detecting user selection of the selected version of the linked content from the thread view.

Example 15 is the computer implemented method of any or all previous examples wherein updating the source document comprises:

interacting with a document store to update the source document with the selected version of the linked content.

Example 16 is the computer implemented method of any or all previous examples and further comprising:

modifying permissions corresponding to the source document based on recipients of the first email message.

Example 17 is the computer implemented method of any or all previous examples wherein modifying permissions comprises:

detecting the recipients of the first email message; and setting the permissions corresponding to the source document based on the detected recipients.

Example 18 is a computing system, comprising:

electronic mail (email) functionality logic that generates a user interface with an email user input mechanism actuatable to perform email functionality, including authoring and sending a first email message;

paste detector logic that detects pasting of a portion of a source document into a body of the first email message;

link generator and maintenance logic that identifies the pasted portion of the source document as linked content in the first email message;

a document update system that detects user selection of a version of the linked content received in a responsive email message, that is responsive to the first email message, and updates the source document with the selected version of the linked content; and new version detector logic configured to detect a new version of the linked content received in a responsive email message.

Example 19 is the computing system of any or all previous examples wherein the document update system comprises:

version selection detector logic that detects user selection of the selected version of the linked content from the edit history view; and document store interaction logic configured to interact with a document store to update the source document with the selected version of the linked content.

Example 20 is the computing system of any or all previous examples and further comprising:

recipient detector logic configured to detect the recipients of the first email message; and permission setting logic that sets the permissions corresponding to the source document based on the recipients identified by the recipient detector logic.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system, comprising:
   at least one processor; and
   memory storing instructions executable by the at least one processor, wherein the instructions, when executed, configure the computing system to:
   generate a first user interface with one or more email user input mechanisms actuatable to perform email functionality, including authoring and sending a first email message;
   detect pasting of a portion of a source document into a body of the first email message;
   identify the pasted portion of the source document as linked content in the first email message;
   send the first email message including the portion of the source document;
   receive a second email message;
   determine that the second email message
     is responsive to the first email message, and
     includes a modified version of the linked content;
   generate a second user interface that:
     renders the second email message including the modified version of the linked content, and
     includes a version selection user input mechanism that is associated with the modified version of the linked content in the second email message, and
actuatable to select the modified version for incorporation into the source document;
based on user actuation of the version selection user input mechanism, select the modified version of the linked content in the second email message; and
in response to the selection, automatically incorporate the modified version of the linked content into the source document.

2. The computing system of claim 1 wherein the instructions configure the computing system to:
detect the modified version of the linked content received in the second email message;
identify, in the modified version, a change from the source document; and
in response to the selection of the modified version, save the change into the source document.

3. The computing system of claim 2 wherein the instructions configure the computing system to detect the new version of the linked content by detecting that the linked content is copied from the first email message into the second email message.

4. The computing system of claim 2 wherein the instructions configure the computing system to:
receive a plurality of responsive email messages, each responsive email message being responsive to the first email message and includes a different modified version of the linked content; and
generate the second user interface to include an edit history view that:
displays the plurality of different modified versions of the linked content, and
includes one or more user input mechanisms that are actuatable to select one or more of the modified versions for incorporation into the source document.

5. The computing system of claim 4 wherein the instructions configure the computing system to:
based on detecting user actuation of the one or more user input mechanisms, select a particular one of the modified versions of the linked content; and
incorporate the particular modified versions into the source document.

6. The computing system of claim 5 wherein the instructions configure the computing system to:
interact with a document store to update the source document with the particular modified version of the linked content.

7. The computing system of claim 1 wherein the instructions configure the computing system to:
modify a permission corresponding to the source document based on recipients of the first email message.

8. The computing system of claim 7 wherein the instructions configure the computing system to:
detect the recipients of the first email message.

9. The computing system of claim 8 wherein the instructions configure the computing system to:
set the permission corresponding to the source document based on the identified recipients.

10. A computer implemented method, comprising:
generating a first user interface with one or more email user input mechanism actuatable to perform email functionality, including authoring and sending a first email message;
detecting pasting of a portion of a source document into a body of the first email message;
identifying the pasted portion of the source document as linked content in the first email message;
sending the first email message including the portion of the source document;
receiving a second email message;
determining that the second email message
is responsive to the first email message, and
includes a modified version of the linked content;
generating a second user interface that:
renders the second email message including the modified version of the linked content; and
includes a version selection user input mechanism that is
associated with the modified version of the linked content in the second email message, and
actuatable to select the modified version for incorporation into the source document:
based on user actuation of the version selection user input mechanism, selecting the modified version of the linked content in the second email message; and
in response to the selection, automatically incorporating the modified version of the linked content into the source document.

11. The computer implemented method of claim 10 and further comprising:
detecting the modified version of the linked content received in the second email message;
identifying, in the modified version, a change from the source document; and
in response to the selection of the modified version, saving the change into the source document.

12. The computer implemented method of claim 11 wherein detecting the modified version comprises:
detecting the modified version of the linked content by detecting that the linked content is copied from the first email message into the second email message.

13. The computer implemented method of claim 11 and further comprising:
receiving a plurality of responsive email messages;
based on a thread identifier associated with each responsive email message, determining that each responsive email message is responsive to the first email message and includes a different modified version of the linked content; and
generating the second user interface to include a thread view that:
displays the plurality of different modified versions of the linked content, and
includes one or more user input mechanisms that are actuatable to select one or more of the modified versions for incorporation into the source document.

14. The computer implemented method of claim 13 wherein updating the source document comprises:
based on detecting user actuation of the one or more user input mechanisms, selecting a particular one of the modified versions of the linked content; and
incorporating the particular modified versions into the source document.

15. The computer implemented method of claim 14 wherein updating the source document comprises:
interacting with a document store to update the source document with the particular modified version of the linked content.

16. The computer implemented method of claim 10 and further comprising:
modifying a permission corresponding to the source document based on recipients of the first email message.

17. The computer implemented method of claim 16 wherein modifying a permission comprises:
   detecting the recipients of the first email message; and
   setting the permission corresponding to the source document based on the detected recipients.

18. A computing system, comprising:
   at least one processor; and
   memory storing instructions executable by the at least one processor, wherein the instructions, when executed, configure the computing system to provide:
      electronic mail (email) functionality logic configured to generate a first user interface with one or more email user input mechanisms actuatable to perform email functionality, including authoring and sending a first email message;
      paste detector logic configured to:
         detect pasting of a portion of a source document into a body of the first email message, and
         generate an indication of the pasting;
      link generator and maintenance logic configured to:
         based on the indication from the paste detector logic, generate a link to the source document that identifies the pasted portion in the body of the first email message as linked content, and
         links the pasted portion to the source document;
      edit history generator logic configured to:
         receive an indication of a set of responsive email message, each responsive email message:
            being associated with the first email message, and
            including a different modified version of the linked content; and
         based on the link, generate a second user interface comprising a thread view that:
            displays an edit history representation including the different modified versions from the set of responsive email messages, and
            includes one or more user input mechanisms that are actuatable to select one or more of the modified versions for incorporation into the source document;
      a document update system configured to:
         based on an indication of user actuation of the one or more user input mechanisms, select a particular one of the modified versions of the linked content; and
         incorporate the particular modified versions including the source document.

19. The computing system of claim 18 wherein the document update system comprises:
   version selection detector logic configured to detect user selection of the selected version of the linked content from the edit history representation; and
   document store interaction logic configured to interact with a document store to update the source document with the selected version of the linked content.

20. The computing system of claim 19 wherein the instructions, when executed, configure the computing system to provide:
   recipient detector logic configured to detect the recipients of the first email message; and
   permission setting logic configured to set a permission corresponding to the source document based on the recipients identified by the recipient detector logic.

\* \* \* \* \*